Aug. 8, 1950     F. A. FIRESTONE ET AL     2,517,994

MEANS FOR MINIMIZING POWER SUPPLY RIPPLES

Filed June 28, 1945     2 Sheets-Sheet 1

INVENTORS
FLOYD A. FIRESTONE
RALPH B. DELANO, JR.
BY
Joseph H. Lipschutz
ATTORNEY INVENTORS
FLOYD A. FIRESTONE
RALPH B. DELANO, JR.
BY
Joseph H. Lipschutz
ATTORNEY Patented Aug. 8, 1950

2,517,994

UNITED STATES PATENT OFFICE 2,517,994

MEANS FOR MINIMIZING POWER SUPPLY RIPPLES

Floyd A. Firestone, Ann Arbor, Mich., and Ralph B. De Lano, Jr., New York, N. Y., assignors to Sperry Products, Inc., Hoboken, N. J., a corporation of New York Application June 28, 1945, Serial No. 602,099

7 Claims. (Cl. 250—36)

This invention relates to those electron devices in which the local voltages for the electron tubes are derived directly from A. C. power without the use of rectifiers or filters. Such devices may be employed whenever a signal can be superimposed on the A. C. cycle in such manner that the signal is synchronized with that portion of the A. C. cycle which renders the electron tubes effective and which passes into the output. The output of such device will necessarily consist of a succession of A. C. pulses upon which there may be superimposed the transmitted signal. The A. C. pulse is usually large in comparison with the signal carried thereby and therefore it is sometimes difficult, particularly where the frequency of the oscillations in each signal approaches the frequency of the A. C. power, to amplify the output sufficiently without having the component of power supply frequency overload the later stages.

It is therefore one of the principal objects of this invention to provide a method and means for minimizing the power supply ripple in the output of a thermionic device wherein the local voltages are supplied directly by A. C. power. This makes it possible for the transmitted signal to be amplified in several stages of amplification in cascade arrangement without having the component of power supply frequency overload the later stages. A further advantage of minimizing or substantially eliminating the A. C. ripple consists in the fact that the signal is rendered readily detectable on any suitable indicator or recording means without danger of having it obscured by the larger power supply frequency.

It is a further object of this invention to provide means for eliminating the A. C. ripple without substantially reducing the voltage on the plate of the thermionic device and therefore without substantially reducing the signal.

Further objects and advantages of this invention will become apparent in the following detailed description thereof.

In the accompanying drawings.

Figure 1:
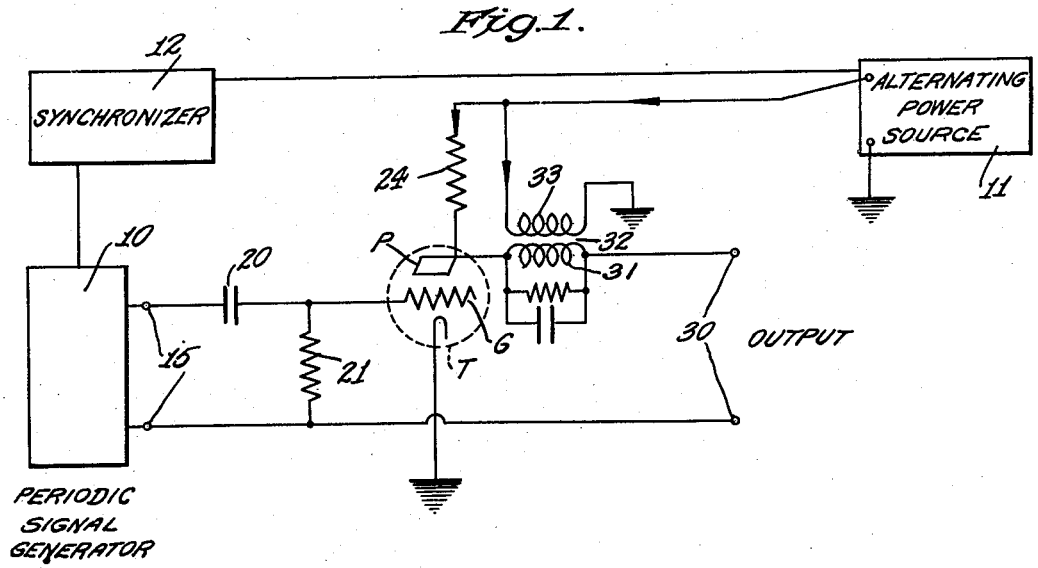
Fig. 1 is an electric diagram showing one embodiment of this invention.

Referring to Fig. 1, there is shown a periodic signal generator 10 which may be of the type disclosed in the patent to Firestone No. 2,280,226, wherein wave trains are emitted periodically. As stated in the above introduction, it is possible to operate the elements of the electron tubes in such devices directly from a source of alternating current 11 if the generator is synchronized with the alternating current by a suitable synchronizer 12, such as, for example, the one shown in the copending patent application of Floyd A. Firestone and Ralph B. De Lano, Jr., Ser. No. 602,098, filed June 28, 1945. In this manner the generated signals are superimposed upon a given portion of each alternating current cycle which then acts as a carrier for the transmitted signal. At the output terminals 15 of the signal generator there will therefore appear a carrier comprising the same portion of the alternating current repeated once for each cycle and the generated signal superimposed on the A. C. pulses. As stated in the introduction, such an output of periodic carrier pulse with superimposed signal results in large carrier or A. C. ripple which tends to obscure the signal, thus rendering it difficult to indicate or record and also prevents amplification of the signal through several stages of amplification by reason of the fact that the component of power supply frequency would overload the later stages of amplification. It is therefore desirable that the A. C. ripple or carrier pulse be substantially eliminated or at least minimized. One method and apparatus for accomplishing this result is disclosed in Fig. 1 wherein the output from the signal generator at terminals 15 is connected to the grid G of a tube T by way of an input circuit consisting of condenser 20 and resistor 21. The plate P of the tube is supplied with unrectified alternating current from the power source 11 by way of resistor 24. Such a simple circuit will function as an amplifier even though operated on alternating power provided that the input signal is synchronized with the alternations of the power as outlined, for example, in the copending patent application of Firestone Serial No. 602,097 filed June 28, 1945 and since abandoned. Thus for instance if the synchronizer 12 synchronizes the power supply 11 and the signal generator 10 so that the signal is generated on the positive portion of the A. C. cycle, then it is apparent that tube T will have a positive voltage on the plate P during that portion of the cycle and tube T will function as an amplifier.

Figure 4:
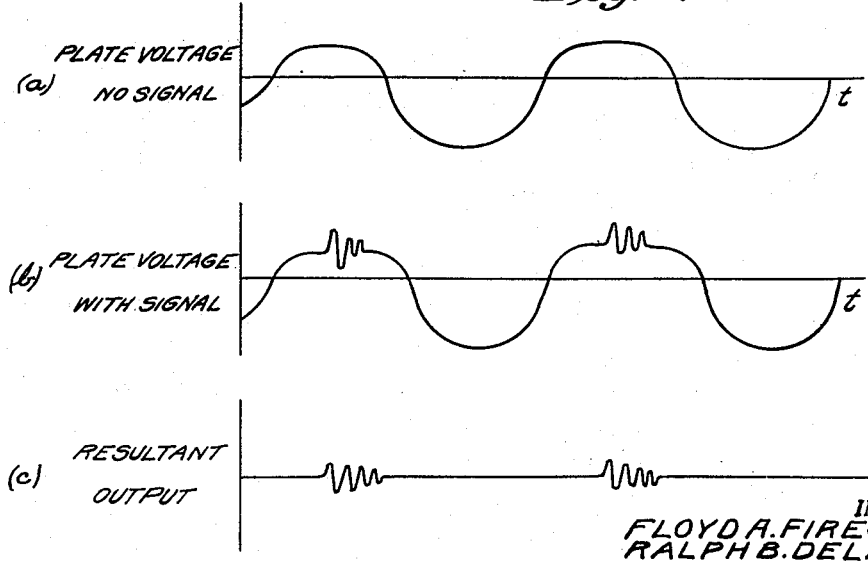
Fig. 4 is a series of graphs illustrating the principle of this invention.

The output from tube T at the output terminals 30 would then be a pulsating voltage with the transmitted signal superimposed on the pulse. The method here shown for substantially eliminating or minimizing the carrier pulses while not affecting the transmitted signal appreciably, consists in providing in the output from the tube T a coil 31 which forms the secondary of a transformer 32, whose primary coil 33 is energized directly from the alternating power source 11. The voltages induced in coil 31 will be opposite in phase to those in coil 33 and therefore opposite in phase to the cycles emitted from tube T, while the magnitude of the induced voltage can be made substantially equal to the magnitude of the carrier pulses by the proper ratio of turns in the transformer coils. Referring to Fig. 4, the action which takes place is illustrated graphically. Graph (a) indicates the plate voltage on the plate P of tube T. Graph (b) illustrates the plate voltage with superimposed signal. The graph (c) illustrates the resulting output when the carrier pulses have been neutralized in the output by the transformer 32. It will be seen that only the signal is left, thus making it possible to amplify the signal through several stages and also rendering the signal relatively easy to detect with or without amplification.

The impedance in the output circuit 30 from tube T is made high relative to the impedance between the plate and cathode of the tube and thus very little of the neutralizing voltage will affect the plate since the major voltage drop will occur across the high impedance output. Therefore the plate voltage will not be substantially reduced by the neutralizing voltage.

Figure 2:
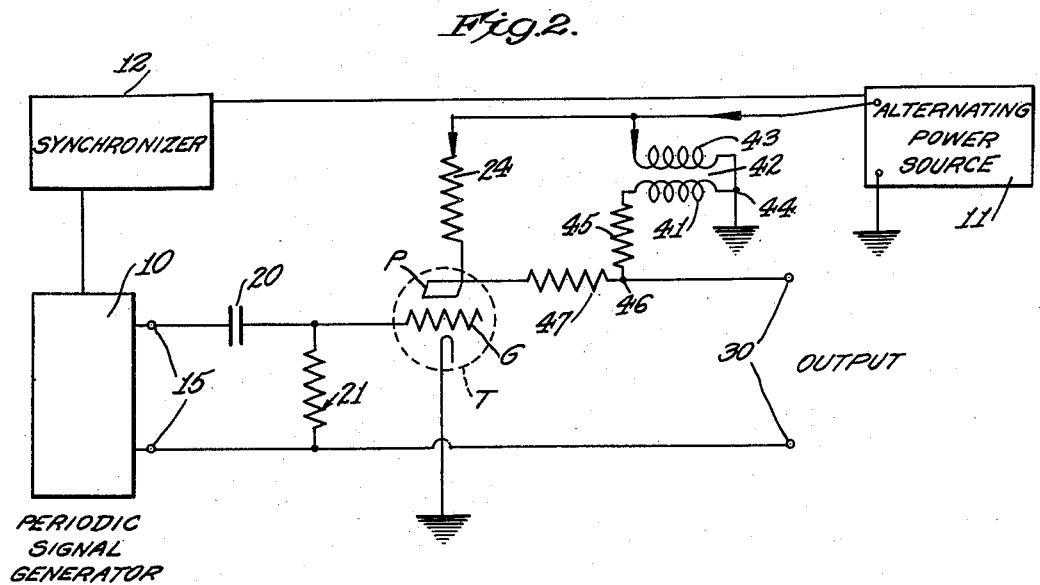
Fig. 2 is a view similar to Fig. 1 showing a modified form of this invention.

In Fig. 2 there is disclosed a modified form of the invention wherein the A. C. ripple is neutralized by superimposing an induced pulse equal in magnitude and opposite in phase by means of a parallel connection instead of the series connection of Fig. 1. In this form the coils 41 and 43 of a transformer 42 have a common connection 44 and the induced current is led by way of resistor 45 to point 46 where it opposes the output voltage from tube T passing through resistor 47. The resistor 45 is made greater than resistor 47 so that the major portion of the voltage drop occurs across resistor 45 and hence across the output 30. By this means the signal is not appreciably diminished. Resistor 47 is made large in comparison to resistor 24 so that the bulk of the voltage drop supplied through resistor 45 is across resistor 47 so that most of the opposing voltage supplied through the resistor 45 at point 46 does not get back to the plate P. In this form also the constants of the transformer 42 and the values of resistors 45 and 47 are so chosen as to substantially eliminate the carrier pulses, while the high impedance of the output circuit will prevent substantial diminution of plate voltage by the neutralizing voltage.

Figure 3:
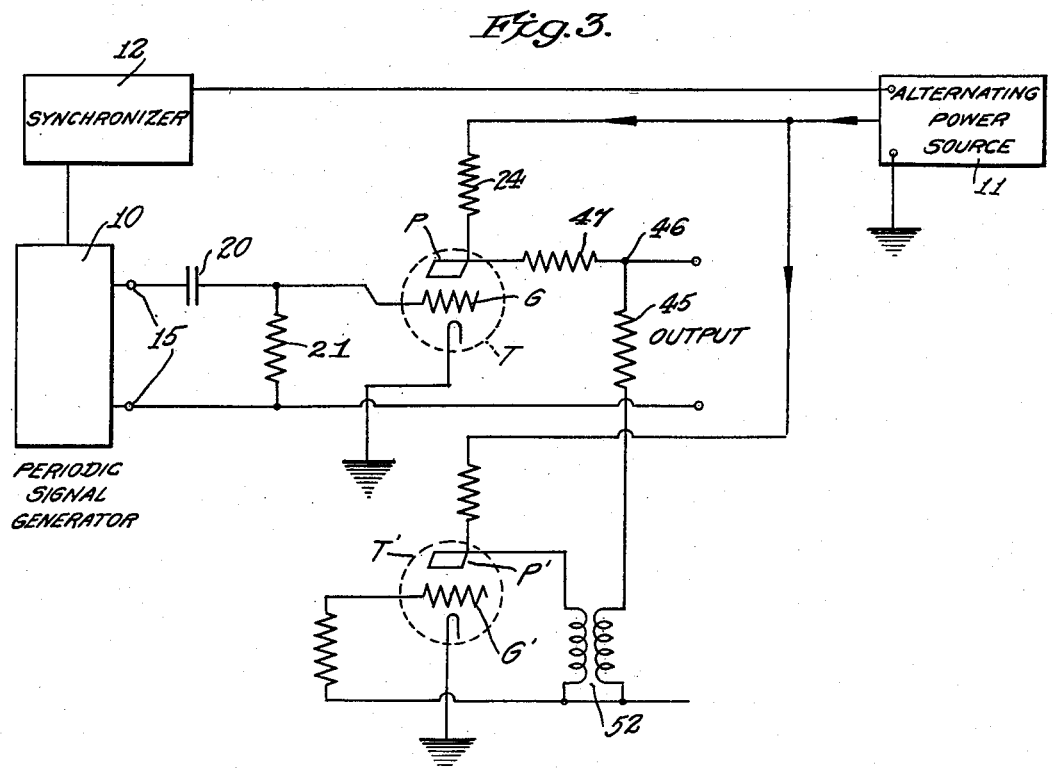
Fig. 3 is a view similar to Figs. 1 and 2 showing another form of this invention.

Still another form of this invention is disclosed in Fig. 3. In the forms of the invention shown in Figs. 1 and 2 the neutralizing voltage was obtained from the alternating power source 11 and took the form of a sine curve. It may be, however, that the tube T is of a type whose output is a modified sine curve and therefore the opposing pulse from the power source would not entirely neutralize the output from tube T throughout its entire pulse. To take care of this condition Fig. 3 discloses the form of invention wherein the opposing pulse is of the same wave form as the output pulse from tube T. For this purpose there is provided a second tube T' whose plate P' is energized from the source 11 in parallel with plate P. The tubes being similar and being similarly energized, their outputs and pulses have the same graphic wave form. These pulses may then be opposed to each other by reversing the phases of one through a transformer 52 and applying the pulse of the proper magnitude and opposite phase to the point 46 through resistor 45 as in Fig. 2. The transformer 52 is shown as applying the neutralizing voltage in parallel with the output of tube T, but it may be applied in series as shown in Fig. 1.

The alternating power source 11 may be any source of periodically fluctuating power and may be defined as alternating power of any wave form, or fluctuating or pulsating power of any wave form, which repeats itself at regular intervals.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use various features and elements in the combination and relations described, some of these may be altered and others omitted without interfering with the more general results outlined, and the invention extends to such use.

Having described our invention, what we claim and desire to secure by Letters Patent is:

1. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising means for applying to the plate circuit fluctuating power pulses substantially equal in magnitude and opposite in phase to the carrier pulses.

2. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising means for applying to the plate circuit fluctuating power pulses from the fluctuating power source substantially equal in magnitude and opposite in phase to the carrier pulses.

3. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising means for inducing in the plate circuit fluctuating power pulses substantially equal in magnitude and opposite in phase to the carrier pulses.

4. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising means for applying to the plate circuit fluctuating power pulses of the same wave form and substantially equal in magnitude.

5. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising a transformer for inducing in the plate circuit fluctuating power pulses substantially equal in magnitude and opposite in phase to the carrier pulses.

6. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising a transformer for inducing in the plate circuit fluctuating power pulses substantially equal in magnitude and opposite in phase to the carrier pulses, said transformer having its primary energized by said fluctuating power source and its secondary in series with said output.

7. In combination, a generator for periodically generating signals, including an electronic tube having a plate and a plate circuit, a source of periodically fluctuating power for supplying to the tube the local voltages for rendering the tube operative, means for synchronizing the generator and the power from said source whereby the signals are superimposed on the power pulses, the power pulses constituting a carrier for the signals, and means for substantially eliminating the fluctuating carrier pulses from the output of the tube without substantial diminution of the signals, said last-named means comprising a transformer for inducing in the plate circuit fluctuating power pulses substantially equal in magnitude and opposite in phase to the carrier pulses, said transformer having its primary energized by said fluctuating power source and its secondary in parallel with said output.

FLOYD A. FIRESTONE.
RALPH B. DE LANO, Jr.

REFERENCES CITED

The following references are of record in the file of this patent:

UNITED STATES PATENTS

| Number | Name | Date |
|---|---|---|
| 1,752,839 | Gardiner | Apr. 1, 1930 |
| 1,795,839 | Heising | Mar. 10, 1931 |
| 1,975,834 | Duncan, Jr. | Oct. 9, 1934 |
| 2,092,496 | Branson | Sept. 7, 1937 |
| 2,120,882 | Ballantine | June 14, 1938 |
| 2,369,206 | Barnes | Feb. 13, 1945 |
| 2,403,984 | Koenig, Jr., et al. | July 16, 1946 |